United States Patent [19]

Kimura

[11] Patent Number: 4,953,631
[45] Date of Patent: Sep. 4, 1990

[54] RADIATOR DEVICE OF MOTORCYCLE

[75] Inventor: Fumikazu Kimura, Hamamatsu, Japan

[73] Assignee: Suzuki Jidosha Kogyo Kabushiki Kaisha, Shizuoka, Japan

[21] Appl. No.: 457,446

[22] Filed: Dec. 27, 1989

[30] Foreign Application Priority Data

Jan. 24, 1989 [JP] Japan .................. 1-13125

[51] Int. Cl.⁵ .................. F01P 11/02; B60K 11/04
[52] U.S. Cl. .................. 165/41; 165/44; 165/51; 165/104.32; 165/917; 123/41.51; 123/41.54; 180/229
[58] Field of Search .................. 165/917, 104.32, 41, 165/44, 51; 123/41.51, 41.54; 180/229

[56] References Cited

U.S. PATENT DOCUMENTS

| | | | |
|---|---|---|---|
| 4,200,065 | 4/1980 | Buddenhagen | 123/41.54 |
| 4,428,451 | 1/1984 | Yamaoka | 165/41 |
| 4,478,306 | 10/1984 | Tagami | 165/41 |
| 4,632,206 | 12/1986 | Morinaka et al. | 165/41 |
| 4,640,341 | 2/1987 | Ozawa | 165/51 |
| 4,662,470 | 5/1987 | Fujisawa et al. | 165/44 |
| 4,673,032 | 6/1987 | Hara et al. | 165/44 |
| 4,739,824 | 4/1988 | Howcroft | 123/41.51 |
| 4,790,369 | 12/1988 | Avrea | 123/41.51 |

FOREIGN PATENT DOCUMENTS

| | | | |
|---|---|---|---|
| 0068337 | 6/1978 | Japan | 123/41.51 |
| 0211519 | 12/1983 | Japan | . |
| 0214616 | 12/1983 | Japan | . |

Primary Examiner—John Ford
Attorney, Agent, or Firm—Schwartz & Weinrieb

[57] ABSTRACT

A radiator device for a motorcycle operatively connected to an engine unit provided with a water jacket and in which cooling liquid circulates comprises a pair of first and second radiator units arranged bilaterally in upright fashion with respect to the motorcycle body. Each of the radiator units is composed of upper and lower tanks in an upright arrangement thereof, the upper tank of the first radiator unit having a top portion disposed at a level lower than a top portion of the upper tank of the second radiator unit. The cooling water directly introduced into the upper tank of the first radiator unit is then divided and one branch flow of the cooling water is fed into the upper tank of the second radiator unit through means of another water tube interconnecting the upper tanks of the first and second radiator units. The water tube has one end connected to the top portion of the first radiator unit and the other end connected to the second radiator unit at a position which is above the connecting position of the one end of the second water tube with respect to the first radiator unit so that the water tube extends upwardly towards the second radiator unit. An air ventilation cap is provided upon the top portion of the upper tank of the second radiator unit.

9 Claims, 4 Drawing Sheets

PRIOR ART

RADIATOR DEVICE OF MOTORCYCLE

FIELD OF THE INVENTION

This invention relates to a radiator device for a motorcycle and, more particularly, to an improvement in the structure of the radiator for a motorcycle which is driven by means of a water cooled engine.

BACKGROUND OF THE INVENTION

A motorcycle which has a water cooled engine of the conventional type is equipped with a radiator for cooling the engine by recirculating water. One kind of radiator comprises a pair of radiator units which are positioned at the front portion of the body of the motorcycle so as to introduce ram or on-coming air currents to the radiator for carrying out an effective heat exchange process.

In the prior art, radiators having various structures have been proposed wherein, for example, some of the motorcycles are equipped with separate radiator units, which are located just behind a head pipe and are positioned against a tank rail extending backwardly from the head pipe, and a down tube extends diagonally backwardly therefrom so as to permit installation of the radiator units in an upright fashion.

The radiator units of the character described above are generally arranged or connected in series or in parallel with each other for recirculating the cooling water.

In the case of the series arrangement of the radiator units, each of which comprises upper and lower tanks, a water tube connected to a water jacket is joined with the lower tank of one radiator unit. The upper tank of this radiator unit and the upper tank of the other radiator unit are interconnected by means of another water tube. A third water tube from the lower tank of the other radiator unit is led to a water pump so as to thereby circulate the cooling water through the radiator units.

In this series arrangement, however, a remarkable pressure drop within the radiator units, has been observed because the flow-path of the cooling water defined between the two radiator units is serially continuous and therefore the entire length of the flow-path is rendered quite long. Accordingly, the amount of cooling water circulating through or along the cooling water flow path is effectively restricted, resulting in a low efficiency of the heat exchange process.

On the other hand, in the case of the parallel arrangement of the radiator units, a water tube connected to a water jacket is branched into water tubes by means of a T-shaped joint and these water tubes are led and connected to the upper tanks of the respective radiator units. Water tubes connected to the lower tanks of the respective radiator units are combined into one tube, which is then led to the water pump so as to thereby circulate the cooling water through the radiator units. The upper tanks of both radiator units are also interconnected through means of an air ventilation hose.

The parallel arrangement of the radiator units may greatly resolve the pressure drop deficiency in comparison with the series arrangement of the radiator units, but the parallel arrangement requires a considerable number of water tubes as described above and the location of the T-shaped joint and the air ventilation hose renders the radiator structure relatively complex and, hence, involves increased cost.

OBJECT OF THE INVENTION

An object of this invention is to substantially eliminate the defects or drawbacks encountered within the prior art described above and to provide a radiator device for a motorcycle including a pair of radiator units capable of substantially reducing the pressure loss within the radiator device, to provide a simple pipe arrangement for circulating the cooling water, and to effectively provide air ventilation for the radiator device.

SUMMARY OF THE INVENTION

The foregoing and other objects can be achieved according to this invention by providing a radiator device for a motorcycle which is of the type which is operatively connected to an engine unit provided with a water jacket and in which cooling liquid circulates, the radiator device comprising a pair of first and second radiator units arranged bilaterally in an upright fashion with respect to the body of the motorcycle, each of the radiator units being composed of upper and lower tanks in an upright arrangement thereof, the upper tank of the first radiator unit having a top portion disposed at a level lower than a top portion of the upper tank of the second radiator unit, a first water tube connecting the upper tank of the first radiator unit and the water jacket of the engine unit, a second water tube interconnecting the upper tanks of both the first and second radiator units, and a tube means connected to the lower tanks of both the first and second radiator units so as to combine the cooling water flow from both lower tanks into one cooling water flow.

In a preferred embodiment, the second water tube has one end connected to the top portion of the first radiator unit and the other end connected to the second radiator unit at a position above the position at which the one end of the second water tube is connected to the first radiator unit, and the second water tube extends upwardly towards the second radiator unit. An air ventilation cap is provided upon the top portion of the upper tank of the second radiator unit. The first radiator unit is disposed upon the lower or tilted side of the motorcycle when the motorcycle is parked in a tilted condition.

According to this invention, the radiator device comprises a pair of radiator units connected in parallel to each other with respect to the cooling water circuit. The cooling water flowing through the first water tube connected to the water jacket of the engine unit flows directly into the upper tank of the first radiator unit and is then fluidically divided therein. This arrangement eliminates an additional connection tube such as, for example, a T-shaped tube for dividing the cooling waterflow before the cooling water enters the first radiator unit. One branch flow of the cooling water is fed towards the upper tank of the second radiator unit through means of the second water tube. The second water tube has one end connected to the top portion of the upper tank of the first radiator unit and the other end connected to the upper tank of the second radiator unit at a position above the connecting position of the one end thereof so as to extend substantially upwardly. Accordingly, the air within the upper tank of the first radiator unit is effectively introduced into the upper tank of the second radiator unit so that the upper tank of the first radiator unit may always be filled with cooling water. The cooling water flows from the upper tanks of both radiator units and are then combined into one flow through means of the water tubes connected to the lower tanks of both radiator units.

BRIEF DESCRIPTION OF THE DRAWINGS

Various other objects, features, and attendant advantages of the present invention will be more fully appreciated from the following detailed description when considered in connection with the accompanying drawings, in which like reference characters designate like or corresponding parts throughout the several views, and wherein.

DETAILED DESCRIPTION OF THE ILLUSTRATED EMBODIMENTS

For a better understanding of this invention, a conventional prior art radiator device of this field will first be described hereunder with reference to the accompanying drawing showing an arrangement of radiator units of a radiator device for a motorcycle.

The radiator units of the radiator device are generally arranged or connected in series or in parallel with each other for recirculating the cooling water.

In the case of the series arrangement, a problem regarding the pressure loss exists as described hereinbefore.

Figure 4:
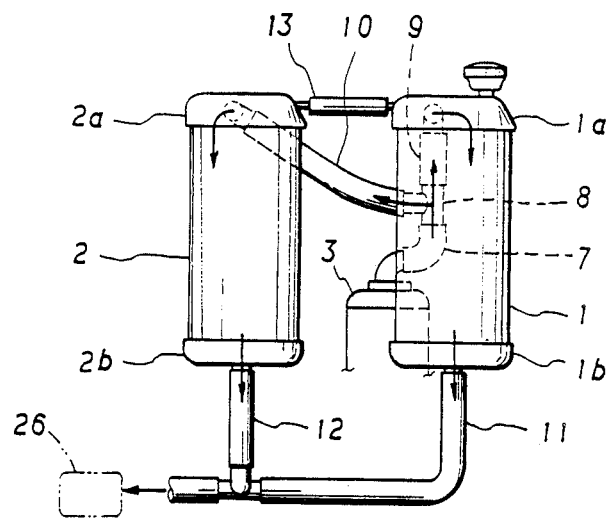
FIG. 4 is a rear view of a conventional radiator device of the parallel type for a motorcycle.

On the other hand, in the case of the parallel arrangement of the radiator units such as, for example, as is shown in FIG. 4, which substantially resolves the problem characteristic of the series arrangement of the radiator units, a water tube 7 connected to a water jacket 3 is divided into water tubes 9 and 10 by means of a T-shaped joint 8 and these water tubes are connected to upper tanks 1a and 2a of the respective radiator units 1 and 2. Water tubes 11 and 12 connected to the lower tanks 1b and 2b of the respective radiator units 1 and 2 are combined into one tube, which is then led to the water pump 26 so as to thereby circulate the cooling water through the radiator units. The upper tanks 1a and 2a of both the radiator units 1 and 2 are interconnected through means of an air ventilation hose 13.

However, even with the parallel arrangement of the radiator units of the radiator device of the conventional type, defects or drawbacks as described hereinbefore nevertheless exist.

This invention was therefore conceived by taking into account the defects or drawbacks encountered within the prior art, and will now be described hereunder by way of preferred embodiments represented by the illustrations of FIGS. 1 and 2.

Figure 1:
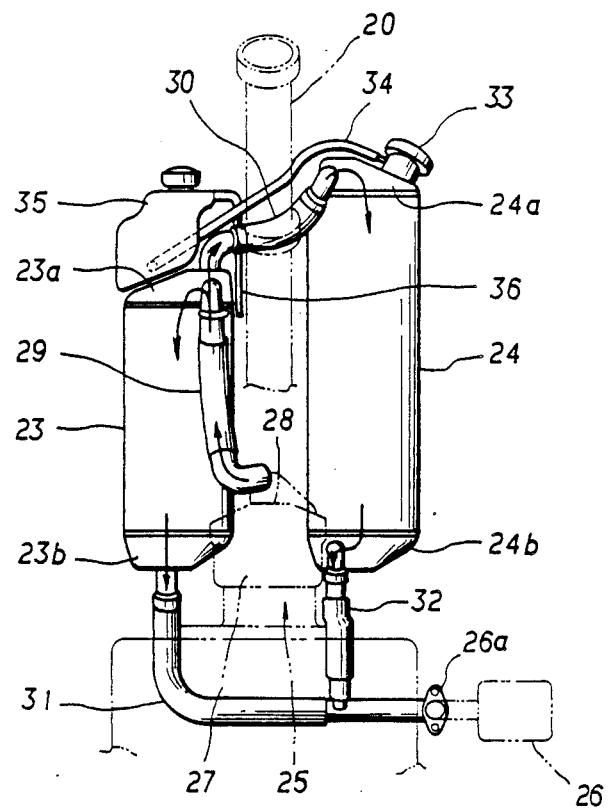
FIG. 1 is a rear view of a preferred embodiment of a radiator device for a motorcycle according to this invention.
Figure 2:
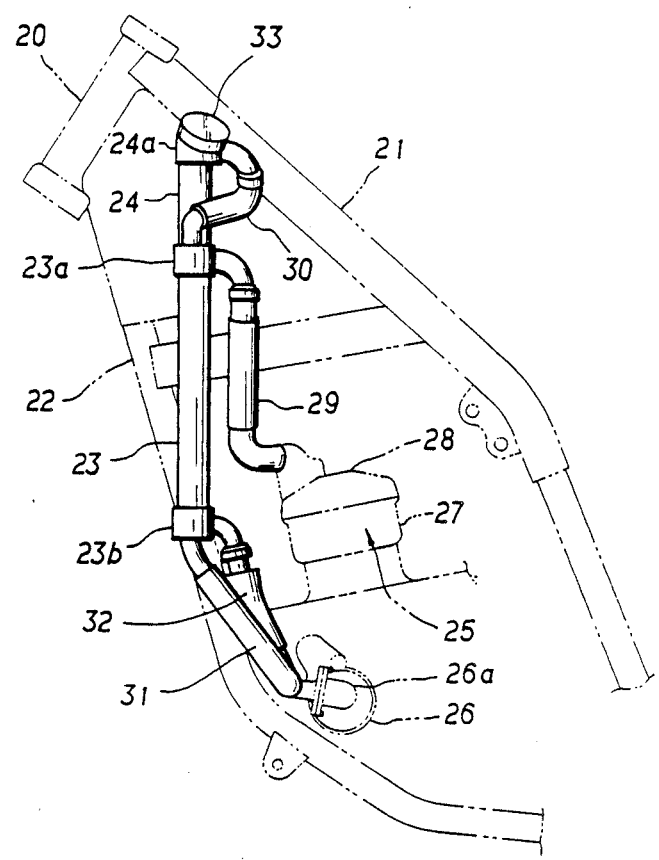
FIG. 2 is a side view showing a piping arrangement of the radiator device shown in FIG. 1.
Figure 3A:
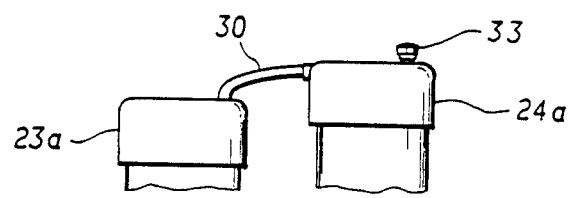
FIGS. 3A to 3D are illustrations showing modifications of the modified arrangement of the upper tanks of both radiator units of the radiator device according to this invention.
Figure 3B:
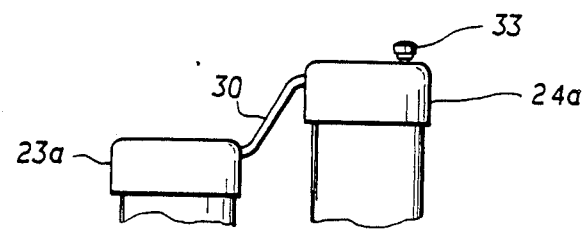
Figure 3C:
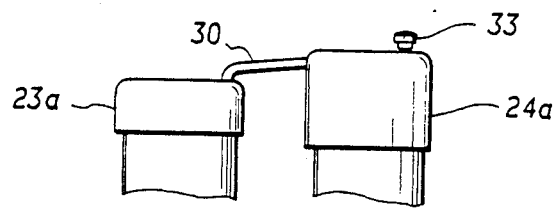
Figure 3D:
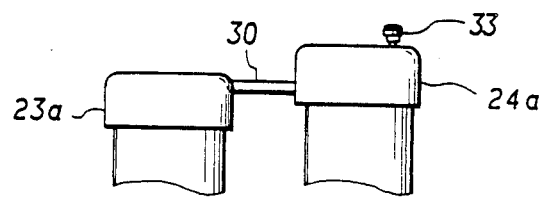

Referring to FIGS. 1 and 2, the front portion of a frame of a motorcycle body is composed of a tank rail 21 extending backwardly from a head pipe 20 and a down tube 22 extending diagonally backwardly from the head pipe 20.

A radiator device comprises a pair of radiator units 23 and 24 arranged in a parallel manner with respect to each other and installed upon opposite sides of the tank rail 21 and the down tube 22. One radiator unit 23 located on the lefthand side, for example, as viewed in the illustration of FIG. 1, includes an upper tank 23a having the top portion positioned at a level lower than the level of the top portion of an upper tank 24a of the other radiator unit 24 located on the righthand side as viewed in FIG. 1.

A water cooled engine 25 mounted upon the motorcycle has associated therewith a water pump 26 driven by means of the engine so as to circulate the cooling water to a water jacket around a cylinder 27 of the engine 25. Warmed-up water at the water jacket is sent to the upper tank 23a of the lefthand radiator unit 23 through means of a water tube 29 connected to a cylinder head 28. The upper tanks 23a and 24a of both radiator units 23 and 24 are interconnected by means of another water tube 30.

The lower tanks 23b and 24b of the radiator units are provided with water tubes 31 and 32, respectively, which are combined at their downstream ends into one tube so as to be connected to a suction nozzle 26a of the water pump 26. An air ventilation cap 33 is provided upon the upper tank 24a of the righthand radiator unit 24 for the purpose of providing air ventilation. In this connection, the motorcycle is usually parked by means of a side stand thereof generally disposed upon the lefthand side of the body of the motorcycle, so that the air ventilation cap 33 always maintains its uppermost position with respect to the radiator units even when the motorcycle is tilted during the parking mode. In this manner it is therefore desirable to arrange the radiator unit 23 having the upper tank 23a at the lower level upon the lefthand side with respect to the body of the motorcycle.

A breather pipe 34 extends from the righthand radiator unit 24 towards a reserve tank 35 located above the upper tank 23a of the lefthand radiator unit 23 and is connected to the bottom of the reserve tank 35 so as to control the water level within the radiator unit 24 by introducing, into the reserve tank 35, the excessive cooling water expanded by means of the temperature increase of the cooling water of the radiator unit 24, or by supplying the water from the reserve tank 35 to the radiator unit 24 so as to replenish the deficient supply of cooling water within tank 24 due to the temperature decrease.

An over-flow pipe 36 is provided within the upper portion of the reserve tank 35.

The radiator device of the construction described above operates as follows.

The cooling water is first led into the upper tank 23a of the lefthand radiator unit 23 and is divided therewith into the upper tanks 23a and 24a of the respective radiator units 23 and 24. The cooling water is then cooled as it flows downwardly within the radiator units 23 and 24 through means of the heat exchanging operation. The cooling water is thereafter led to the suction nozzle 26a of the water pump 26 through means of the water tubes 31 and 32 so as to thereby complete the circulation of the cooling water, whereby the recirculation of the cooling water is finally established between the water jacket of the engine 25 and the radiator units 23 and 24.

According to this invention, as described hereinabove, since the cooling water is conducted into the radiator units arranged in parallel and is divided within one of the radiator units having an upper tank disposed at a lower level with respect to the upper tank of the other radiator unit, the cooling effect due to the radiator units can be enhanced and remarkably improved by reducing the pressure loss and increasing the flow rate of the cooling water. In addition, the piping arrangement can also be simplified in comparison with that of the conventional radiator device.

It is to be understood by persons skilled in the art that this invention is not limited to the embodiments described above and many other changes and modifications may be made without departing from the scope of the appended claims.

For example, as briefly illustrated in FIGS. 3A to 3D, the locations of the upper tanks of the first and second radiator units and the water tube connecting them may be achieved in accordance with various modifications. In these modifications, it is only necessary that the top portion of the upper tank 23a be positioned at a level lower than the location of the top portion of the upper tank 24a and that the water tube 30 extends upwardly, at least horizontally, from the upper tank 23a towards the upper tank 24a. In FIGS. 3A to 3D, like reference numerals are added to elements corresponding to those shown in FIG. 1.

What is claimed is:

1. A radiator device for a motorcycle of the type operatively connected to an engine unit provided with a water jacket and within which cooling liquid circulates, comprising:
    a pair of first and second upstanding radiator units arranged in a laterally spaced fashion with respect to a body portion of said motorcycle, each of said radiator units being composed of upper and lower tanks disposed in an upright arrangement thereof, the upper tank of said first radiator unit having a top portion thereof disposed at a level which is lower than a top portion of the upper tank of said second radiator unit when said motorcycle is disposed in a normal vertically upright positional mode;
    a first water tube means connecting said upper tank of said first radiator unit and said water jacket of said engine unit;
    a second water tube means interconnecting said upper tanks of said first and second radiator units; and
    tube means connected to said lower tanks of said first and second radiator units for combining cooling water flows from said lower tanks of said first and second radiator units into one cooling water flow.

2. A radiator device according to claim 1, wherein said second water tube means extends substantially linearly upwardly from said upper tank of said first radiator unit towards said upper tank of said second radiator unit.

3. A radiator device according to claim 2, wherein:
    said second water tube means has one end thereof connected to a portion of said upper tank of said first radiator unit, and another end thereof connected to said upper tank of said second radiator unit at a position which is above the position at which said one end of said second water tube means is connected to said portion of said upper tank of said first radiator unit.

4. A radiator device according to claim 3, wherein said portion of said upper tank of said first radiator unit to which said one end of said second water tube means is connected in the top portion of said upper tank of said first radiator unit.

5. A radiator device according to claim 1, wherein:
    said first radiator unit is positioned upon a downwardly tilted side of said body portion of said motorcycle when said motorcycle is parked in a tilted position.

6. A radiator device according to claim 1, wherein an air ventilation cap is provided within said top portion of said upper tank of said second radiator unit.

7. A radiator device as set forth in claim 1, further comprising:
    a reserve tank disposed above said upper tank of said first radiator unit.

8. A radiator device as set forth in claim 7, further comprising:
    a breather pipe interconnecting said reserve tank and said second radiator unit so as to provide a fluidic exchange of cooling water between said reserve tank and said second radiator unit in response to temperature conditions prevailing within said second radiator unit.

9. A radiator device as set forth in claim 8, further comprising:
    an overflow pipe fluidically connected to said reserve tank.

* * * * *